(12) United States Patent
Delfs

(10) Patent No.: US 9,244,863 B2
(45) Date of Patent: Jan. 26, 2016

(54) COMPUTING DEVICE, WITH DATA PROTECTION

(75) Inventor: Eckhard Delfs, Nuremberg (DE)

(73) Assignee: Intel Deutschland GmbH, Neubiberg (DE)

( * ) Notice: Subject to any disclaimer, the term of this patent is extended or adjusted under 35 U.S.C. 154(b) by 1567 days.

(21) Appl. No.: 11/671,146

(22) Filed: Feb. 5, 2007

(65) Prior Publication Data

US 2008/0189559 A1    Aug. 7, 2008

(51) Int. Cl.
| | |
|---|---|
| G06F 21/62 | (2013.01) |
| G06F 12/14 | (2006.01) |
| G06F 21/72 | (2013.01) |
| G06F 21/79 | (2013.01) |
| G06F 21/60 | (2013.01) |

(52) U.S. Cl.
CPC ............ G06F 12/1408 (2013.01); G06F 21/72 (2013.01); G06F 21/79 (2013.01); *G06F 21/60* (2013.01); *G06F 21/62* (2013.01); *G06F 21/6209* (2013.01); *G06F 21/6218* (2013.01); *G06F 2221/2105* (2013.01)

(58) Field of Classification Search
CPC ..... G06F 21/6218; G06F 21/60; G06F 21/62; G06F 21/602; G06F 21/6209; G06F 21/6227
USPC .................. 726/2, 26, 27; 713/168, 189, 193; 380/44, 45, 277
See application file for complete search history.

(56) References Cited

U.S. PATENT DOCUMENTS

| | | | |
|---|---|---|---|
| 5,764,984 A * | 6/1998 | Loucks | 719/319 |
| 6,918,036 B1 * | 7/2005 | Drews | 713/176 |
| 2004/0030903 A1 * | 2/2004 | Hicks et al. | 713/176 |
| 2005/0081065 A1 * | 4/2005 | Brickell et al. | 713/202 |
| 2005/0097348 A1 * | 5/2005 | Jakubowski et al. | 713/200 |
| 2006/0005230 A1 * | 1/2006 | England et al. | 726/1 |
| 2006/0020781 A1 * | 1/2006 | Scarlata et al. | 713/100 |

FOREIGN PATENT DOCUMENTS

JP        2003-209545 A        7/2003

* cited by examiner

*Primary Examiner* — Alexander Lagor
(74) *Attorney, Agent, or Firm* — Schiff Hardin LLP

(57) ABSTRACT

Computing device with a processing system including a plurality of user sub-systems, a plurality of user sub-system identifiers respectively identifying one user sub-system of the plurality of user sub-systems, a processor configured to run the processing system, a cryptography unit configured to provide at least one cryptographic mechanism, a cryptography unit secret key assigned to the cryptography unit, and a binder configured to bind the cryptography unit secret key to the user sub-system identifier of a currently running user sub-system.

33 Claims, 5 Drawing Sheets

COMPUTING DEVICE, WITH DATA PROTECTION

BACKGROUND

The present invention relates generally to a computing device, to a communication device, and to a method for operating a computing device.

In a micro-kernel based system, multiple operating systems can be executed in parallel. One of the advantages of using a micro-kernel is that it allows building different compartments which are invisible to each other. A compartment can be seen as a logical abstraction of a computing platform providing memory, processing power etc. Each operating system can be assigned to one compartment. The task of the micro-kernel is to provide address spaces, execution threads and inter-process communication (IPC) methods to the compartments. As certain HW resources such as peripherals may need to be shared by different compartments, the micro-kernel also has to provide methods to dynamically assign these resources on request. One major attribute of micro-kernels is that they do not execute driver code, which usually makes up the main part of kernel code in standard monolithic systems.

As the name indicates, micro-kernels have very limited functionality and thus only require a minimal memory footprint on a target platform. It might even be possible to formally prove the correct functionality of a micro-kernel in a way, that certain security threats such as buffer overflows known from monolithic operating systems (Windows, Linux etc.) cannot be executed at all.

An easy and secure access control to a crypto-engine is desired.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
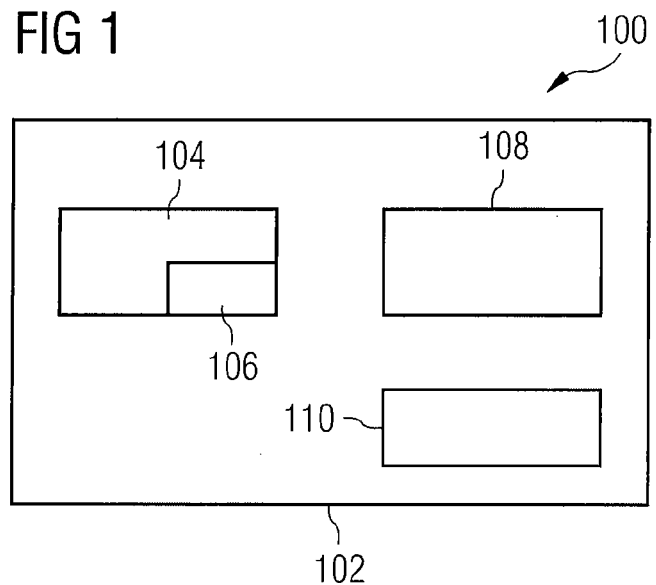
FIG. 1 shows the relevant hardware components of a computing device according to an embodiment of the invention

In a given typical single processor system, a micro-kernel uses the privileged mode of the micro processor to execute its tasks, such as configuring the memory management unit (MMU), handle interrupts etc. On the other hand, operating systems running in their assigned compartment always run in user mode, even the kernel part. There exist also processor systems comprising more than two privilege levels, which can be further used to increase the security level between user and kernel part of a typical operating system in a given compartment, but common to all micro-kernel based systems is the fact, that only the micro-kernel is given the most privileged processor level. Since only this circumstance is relevant to some embodiments of the invention, the subsequent description will only focus on processor systems with two privilege levels. The enhanced security level of a micro-kernel based architecture becomes obvious in the case, that if an attacker manages to penetrate the kernel level of an operating system in its respective compartment, he will only be able to manipulate data or operations in this compartment. The other compartments are protected by the MMU or other system HW security features, which the attacker cannot tamper with, since he is not able to switch the processor into privileged mode.

Security relevant data can be classified into two groups:
(A) Data belonging to an end-user; and
(B) Data belonging to a third party such as a content owner.

Whereas data belonging to category (A) typically require a password only known to the user, the protection of data belonging to category (B) is usually more difficult. One way of solving this problem is to equip the processing platform with a secret hardware key, e.g. an electronic fuse (e-fuse) key which is blown during manufacture. In order to protect any third party assets, this secret key can be used. Typically, such a secret key is built into a HW crypto engine (HCE), which means that the key cannot be read from a register or memory address, but only be used in combination with a certain cryptographic algorithm such as HMAC (keyed-hash message authentication code), 3DES (Triple-Data Encryption Standard) or AES (Advanced Encryption Standard).

In the context of a micro-kernel based system, different compartments may need access to the HCE during runtime. One compartment may need it to unwrap a private key such as used in OMA DRM (Open Mobile Alliance Digital Rights Management) 2.0, whereas another may need it to setup a secure communication channel to a SIM (Subscriber Identity Module)-card. Each compartment may use the HCE to read or write encrypted data from or to non-volatile memory. Access to the HCE is controlled by the micro-kernel. It ensures that the HCE can only be passed from one compartment to another, if the owning compartment has indicated that its usage is completed and all potential secrets located in HCE registers are wiped out. The HCE driver code usually runs in the kernel domain of a compartment.

The problem now is that all compartments use the HCE in the same way for protecting their data, as the HCE provides a common register interface.

An obvious threat can be seen in the following scenario:

An attacker has managed to penetrate the kernel of a certain OS (Operating System) in a compartment. This means, after a successful request of the HCE from the micro-kernel, he can use it for any purpose. If he also manages to get access to any encrypted data stored on non-volatile memory belonging to other compartments (which should not be very difficult, as it is stored somewhere on the NV (Non-Volatile)-memory system), he could then use the HCE to unveil or manipulate that data in any way.

The consequence is that even the micro-kernel architecture does not protect from this kind of attack. Further methods are desired to be deployed. Possible solutions are:

The HCE is provided with different secret HW keys, one for each compartment. The micro-kernel then needs to configure the HCE accordingly before assignment to a requesting compartment. One drawback in this case is that this is quite an expensive solution, as the number of required e-fuse keys grows linear with the number of compartments which need HCE services.

The operating system itself running in a compartment applies obscurity methods by using additional data e.g. process attribute information for the encryption of decryption process. One drawback of this method is that it does not really help against kernel-level attacks. Eventually, the obscurity method may be known to an attacker so that he could easily bypass this level of protection.

In the following, an embodiment is provided, which does not rely on obscurity methods and only requires minor additional HW costs.

One embodiment of the invention is provided for the OMTP P4/T6 (Open Mobile Terminal Platform) profile which is a defined hardware security profile for mobile platforms (TR 1).

In an embodiment of the invention, a computing device in which the data protection of user sub-systems of a processing system where the sub-systems are running in parallel is improved. The processing system is in an embodiment of the invention a micro-kernel based system, where the kernel contains only the minimal software essential to run the processing system. The user sub-systems may contain e.g. operating system drivers or user applications. One embodiment of the invention provides a system and a method to prevent that an attacker intruding into one of the user sub-systems gets access to data of another user sub-system. This is achieved by assigning an identifier to each of the user sub-systems and binding this identifier to a secret key.

It should be noted that in an alternative embodiment of the invention, the processing system can be any kind of processing system, e.g. any kind of processing system providing a plurality of independent process threads, e.g. a plurality of independent compartments. In one embodiment of the invention, the processing system may include one or a plurality of operating systems.

FIG. 1 shows some hardware components of a computing device 102 according to an embodiment of the invention. The computing device 102 includes a processor 110, which is running a processing system 202 (see FIG. 2), a cryptography unit (HCE) 104 which provides at least one cryptographic mechanism, a cryptography unit secret key 106 being assigned to the cryptography unit 104 and in an embodiment at least one internal memory 108. In an embodiment of the invention, the computing device 102 is integrated on one common substrate, e.g. monolithically integrated on one common substrate. Thus, in an embodiment of the invention, the computing device 102 may be provided as a system-on-chip (SoC) component.

Figure 2:
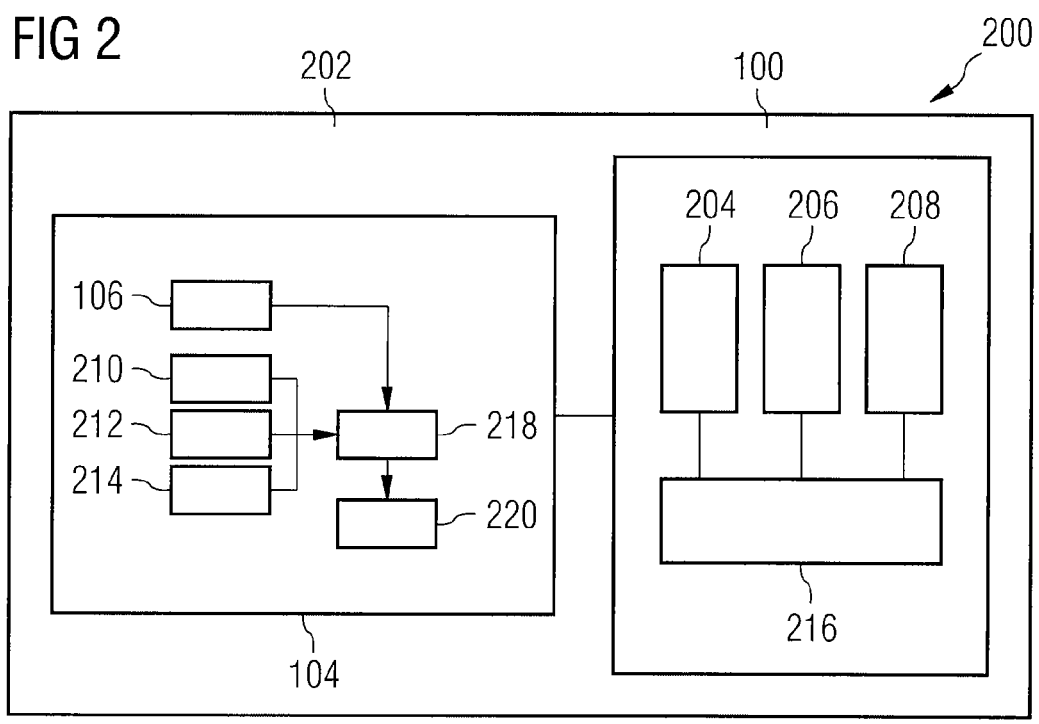
FIG. 2 shows the software components of a computing device according to an embodiment of the invention.

FIG. 2 shows the software components of the computing device 102 according to an embodiment of the invention.

The computing device 102 includes a processing system 202 having a plurality of user sub-systems 204, 206, 208 and user sub-system identifiers 210, 212, 214. The user sub-system identifiers 210, 212, 214 are e.g. stored in the internal memory 108 or, as indicated in FIG. 2, in registers of the cryptography unit 104. Each of the plurality of user sub-system identifiers 210, 212, 214 identifies one of the user sub-systems 204, 206, 208. The cryptography unit secret key 106 is bound by a binder 218 to the user sub-system identifier 210, 212, 214 of the user sub-system which is currently running, as e.g. the user sub-system identifier 210 to the user system 204 in the example shown in FIG. 2.

In an embodiment of the invention, the expression "currently running" may be understood such that the binding refers to the moment, at which the HCE is assigned to a particular user sub-system, e.g. in response to a request for one or more crypto operations. This may mean that shortly after the micro-kernel has established the binding, i.e. shortly after the micro-kernel has completed the cryptography unit secret key (e.g. 106) having a corresponding user sub-system identifier (e.g. CID) and subsequently has provided it to the requesting user sub-system, it may occur that the micro-kernel switches to another user sub-system ("context switch") (which may then of course not use the HCE). This may mean that after the switching another user sub-system identifier (e.g. CID) may be "active", while the binding in the HCE may still refer to the previous user sub-system identifier (e.g. CID).

Figure 3:
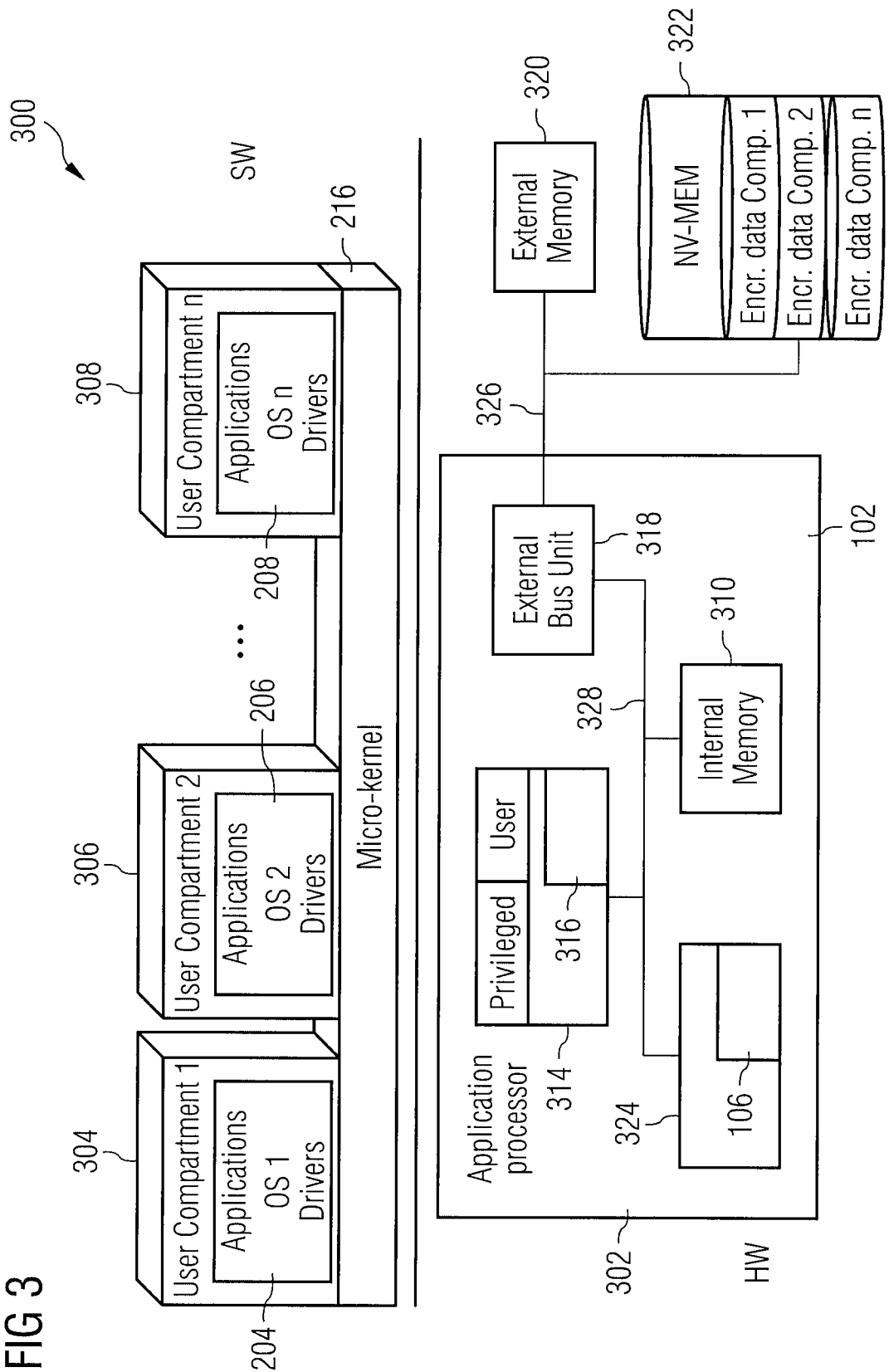
FIG. 3 shows a general architecture of the computing device with the relevant components according to an embodiment of the invention.

In an embodiment of the invention the processing system 202 contained in the computing device 102 is based on a micro-kernel system. The micro-kernel 216 provides basic operating system services for the user sub-systems 204, 206, 208. In an embodiment of the invention, each user sub-system 204, 206, 208 is contained in a respective micro-kernel user compartment 304, 306, 308, which is shown in FIG. 3. Each user sub-system 204, 206, 208 in the user compartments 304, 306, 308 may for example include software applications and/or operating system software, as e.g. operating system drivers.

In an embodiment of the invention the cryptography unit 104 is a hardware crypto engine (HCE) 324 (see FIG. 3). The cryptography unit 104 provides in a further embodiment at least one cryptographic mechanism of a group of cryptographic mechanisms consisting of authentication, encryption, decryption, digital signature, and cryptographic hash value generation.

In an embodiment of the invention, the cryptography unit secret key 106 is stored in the hardware crypto engine 324.

In a further embodiment of the invention, the user sub-system identifier 210, 212, 214 of the currently running user sub-system 204, 206, 208 is stored in the hardware crypto engine 324.

According to another embodiment, the user sub-system identifier 210, 212, 214 of the currently running user sub-system 204, 206, 208 is stored in a portion of the memory 108 that is only accessible by the cryptography unit 104. The location where the sub-system identifier is stored needs to be protected by the memory management unit (MMU) 316 of the CPU 314 (see FIG. 3).

In a still further embodiment of the invention the computing device 102 includes at least one memory interface 326 for connecting at least one external memory 320, 322 to the computing device 102 as e.g. the external memory 320 or the non-volatile memory 322 as depicted in FIG. 3. The memory interface 326 connects the external memory 320, 322 e.g. via an External Bus Unit 318 to the internal bus 328 of the processor 302. The non-volatile memory 322 contains in an embodiment of the invention the encrypted data of the user compartments 304, 306, 308.

In an embodiment of the invention, the binder 218 is operating on the cryptography unit secret key 106 and the user sub-system identifier 210, 212, 214 of the currently running user sub-system 204, 206, 208 to generate a user sub-system specific cryptography unit secret key 220.

In an embodiment of the invention, the binder 218 is operating on the cryptography unit secret key 106 and the user sub-system identifier 210, 212, 214 of the currently running user sub-system 204, 206, 208 according to a predefined logic function.

In an embodiment of the invention, the binder 218 is operating on the cryptography unit secret key 106 and the user sub-system identifier 210, 212, 214 of the currently running user sub-system 204, 206, 208 according to an eXclusive OR (XOR) function.

In a further embodiment a communication device includes a computing device 102, the computing device 102 including a processing system 202 having a plurality of user sub-systems 204, 206, 208, a plurality of user sub-system identifiers 210, 212, 214, each user sub-system identifier 210, 212, 214 identifying one user sub-system of the plurality of user sub-systems 204, 206, 208, a processor 110 running the processing system 202, a cryptography unit 104 providing at least one cryptographic mechanism, a cryptography unit secret key 106 being assigned to the cryptography unit 104, and a binder 218 binding the cryptography unit secret key 106 to the user sub-system identifier 220 of the currently running user sub-system 204, 206, 208. In an embodiment the computing device 102 is a mobile radio communication device.

In a further embodiment of the invention, a computing device 102 includes a micro-kernel based processing system 202 having a plurality of user sub-systems 204, 206, 208 and a plurality of user sub-system identifiers 210, 212, 214. Each user sub-system identifier 210, 212, 214 identifies one user sub-system of the plurality of user sub-systems 204, 206, 208. The computing device 102 further includes a processor 110 running the processing system 202, a cryptography circuit 104 providing at least one cryptographic mechanism, a cryptography circuit secret key 106 being assigned to the cryptography circuit 104, and an operator 218 operating on the cryptography circuit secret key 106 and the user sub-system identifier 210, 212, 214 of the currently running user sub-system 204, 206, 208 to generate a sub-system specific cryptography circuit secret key 220.

In an embodiment, each user sub-system 204, 206, 208 is contained in a respective micro-kernel compartment 304, 306, 308. Each user compartment 304, 306, 308 includes in an exemplary embodiment software applications and/or operating system software.

In still another embodiment of the invention, the cryptography circuit 104 in the communication device is a hardware crypto engine 324. Further, the cryptography circuit 104 may, according to an embodiment, provide at least one cryptographic mechanism of a group of cryptographic mechanisms consisting of authentication, encryption, decryption, digital signature and cryptographic hash value generation. In an embodiment the cryptography circuit secret key 106 is stored in the hardware crypto engine 324.

In a further embodiment, the user sub-system identifier 210, 212, 214 of the currently running user sub-system 204, 206, 208 is stored in the hardware crypto engine 324.

In an embodiment, the computing device 102 includes at least one memory 108. The user sub-system identifier 210, 212, 214 of the currently running user sub-system 204, 206, 208 is stored in a portion of the memory 108 that is only accessible by the cryptography circuit 104.

In a further embodiment, the computing device 102 has at least one memory interface 326 for connecting at least one external memory 320, 322 to the computing device 102. The interface 326 connects the internal bus 328 to the external memory 320, 322, e.g. via an External Bus Unit 318.

In a further embodiment the operator is operating on the cryptography circuit secret key 106 and the user sub-system identifier 210, 212, 214 of the currently running user sub-system 204, 206, 208 according to a predefined logic function.

In an embodiment, the binder 218 is operating on the cryptography circuit secret key 106 and the user sub-system identifier 210, 212, 214 of the currently running user sub-system 204, 206, 208 according to an eXclusive OR function. In an alternative embodiment of the invention, any other suitable logic function, e.g. any other suitable type of binary logic function, may be provided.

In one embodiment of the invention a communication device includes a computing device 102, the computing device 102 including a micro-kernel based processing system 202 including a plurality of user sub-systems 204, 206, 208, a plurality of user sub-system identifiers 210, 212, 214, each user sub-system identifier 210, 212, 214 identifying one user sub-system of the plurality of user sub-systems 204, 206, 208, a processor 110 running the processing system 202, a cryptography circuit 104 providing at least one cryptographic mechanism a cryptography circuit secret key 106 being assigned to the cryptography circuit 104; and an operator 218 operating on the cryptography circuit secret key 106 and the user sub-system identifier 210, 212, 214 of the currently running user sub-system 204, 206, 208 to generate a user sub-system specific cryptography unit secret key 220.

In an embodiment, the communication device is a mobile radio communication device.

Figure 4:
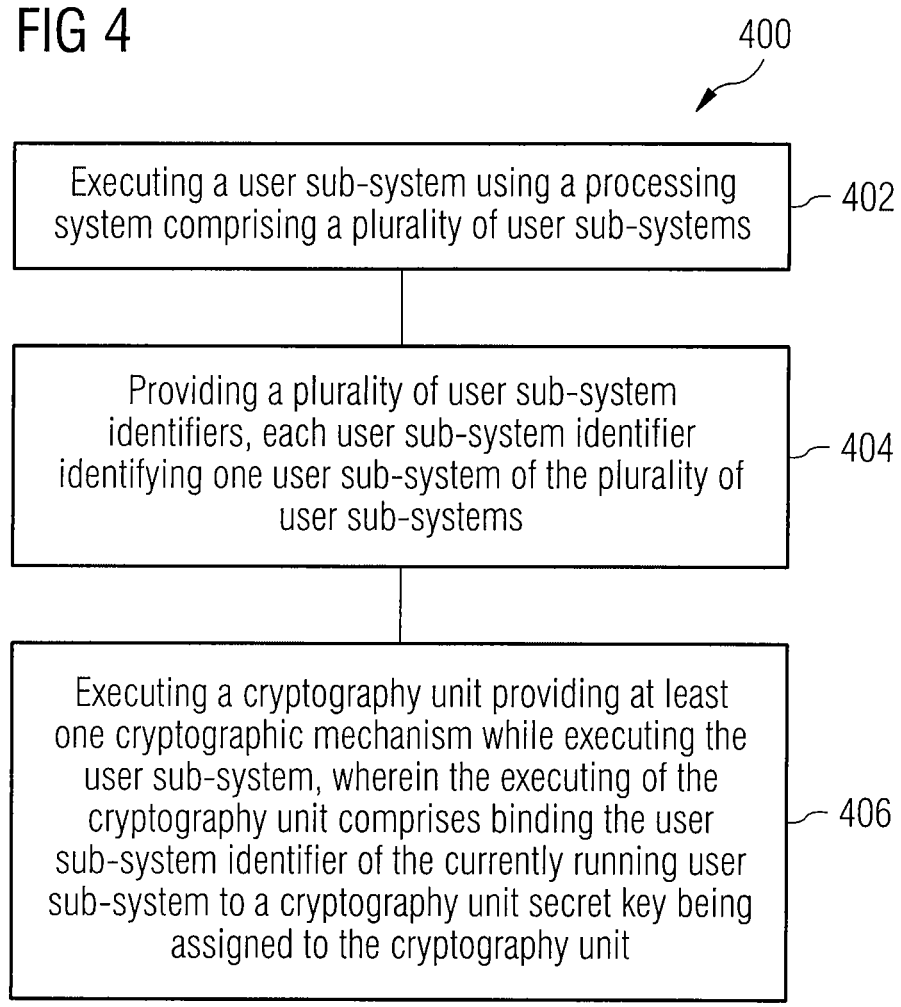
FIG. 4 shows a diagram of the method for operating a computing device according to an embodiment of the invention.

FIG. 4 shows in a further embodiment of the invention a method for operating a computing device 102.

In 402, a user sub-system 204, 206, 208 using a processing system 202 including a plurality of user sub-systems 204, 206, 208 is executed.

In 404, a plurality of user sub-system identifiers 210, 212, 214 is provided, each user sub-system identifier 210, 212, 214 identifying one user sub-system of the plurality of user sub-systems 204, 206, 208.

In 406, a cryptography unit 104 providing at least one cryptographic mechanism while executing the user sub-system 204, 206, 208 is executed, wherein the executing of the cryptography unit 104 includes binding the user sub-system identifier 210, 212, 214 of the currently running user sub-system 210, 212, 214 to a cryptography unit secret key 106 being assigned to the cryptography unit 104.

In an embodiment of the method for operating a computing device 102 a micro-kernel based processing system is used as the processing system 202.

In an embodiment of the method above each user sub-system is contained in a respective micro-kernel compartment 304, 306, 308. In an embodiment, each user compartment 304, 306, 308 includes software applications and/or operating system software.

In an embodiment of the method for operating a computing device 102 a hardware crypto engine 324 is used as the cryptography unit 104.

In an embodiment of the method the cryptography unit 104 provides at least one cryptographic mechanism of a group of cryptographic mechanisms consisting of authentication, encryption, digital signature, cryptographic hash value generation.

In a further embodiment of the method the cryptography unit secret key 106 is stored in the hardware crypto engine 324.

In an embodiment of the method the user sub-system identifier 210, 212, 214 of the currently running user sub-system 204, 206, 208 is stored in the hardware crypto engine 324.

In an embodiment of the method the user sub-system identifier 210, 212, 214 of the currently running user sub-system 204, 206, 208 is stored in a portion of a memory 108 that is only accessible by the cryptography unit 104.

In an embodiment of the method the binding is carried out by operating on the cryptography unit secret key 106 and the user sub-system identifier 210, 212, 214 of the currently running user sub-system 204, 206, 208 to generate a user sub-system specific cryptography unit secret key 220.

In an embodiment of the method the binding is carried out by operating on the cryptography unit secret key 106 and the user sub-system identifier 210, 212, 214 of the currently running user sub-system 204, 206, 208 according to a predefined logic function.

In an embodiment of the method the binding is carried out by operating on the cryptography unit secret key 106 and the user sub-system identifier 210, 212, 214 of the currently running user sub-system 204, 206, 208 according to an Exclusive OR function.

In an embodiment of the invention the user sub-system identifier 210 which is tantamount to a Compartment Identifier (CID) in the micro-kernel based system as shown in FIG. 3 is assigned from the micro-kernel 216. In the simplest case, this could be an integer value, whose maximum value is limited by the number of compartments. However, any other type of identifier may be used in an alternative embodiment of the invention. As explained in more detail further below, the CID is stored in an address space which is protected by the MMU 316 being part of the CPU 314 and thus, can only be changed, when the micro-kernel 216 is running. The protected address space is e.g. located in the internal memory 108 or in a register of the cryptography unit 104. The assignment of CIDs to compartments is fixed and its allocation protected by a secure boot mechanism, i.e. a mechanism where only authenticated software is loaded and executed after system startup.

Any time a user compartment 304, 306, 308 requests access to the crypto engine HCE 324, the micro-kernel 216 first configures the HCE 324 in a special way. This means, that it provides the HCE 324 with the CID corresponding to the requesting user compartment 304, 306, 308. Afterwards, the micro-kernel 216 transfers the control of the HCE 324 to the user compartment 304, 306, 308. The user compartment driver code cannot modify this special crypto engine driver configuration, as it is hardware protected (see detailed embodiments).

The effect of this special HCE configuration is, that any time the secret hardware (HW) key 106 is applied for encryption, decryption or keyed-hash message authentication code (HMAC) calculations the HCE 324 automatically incorporates the CID in its cryptographic procedures. This results in the fact, that every encrypted data becomes bound not only to the secret HW key 106 but as well to its CID. It is to be noted, that the CID itself is not secret; it could even be read-only for a user-compartment. In one embodiment of the invention, the attacker cannot change the CID or prevent the HCE 324 from using it.

One effect of an embodiment of the invention is that the stakeholder assets are protected independently from each other. A security breach in one user compartment 304, 306, 308 only affects data belonging to this compartment 304, 306, 308. This means it pays off for each stakeholder to invest in suitable measures to verify his compartment code.

As another effect, the implementation effort is minimal. In respect to the software only a small piece of code is needed to update the CIDs and make it available to the HCE 324. In respect to the hardware, two changes are provided (see embodiments outlined further below): A protected mechanism to make the CID information available in the HCE 324 and a mechanism in the HCE 324 to use the CID during secret key processing.

In an embodiment of the invention, the computing device 102 includes a micro-kernel based system which supports execution of multiple threads in dedicated memory address spaces. Memory protection is enforced by a memory protection unit (MMU) 316 which is controlled by the micro-kernel (see FIG. 3). The CPU 314 of the system supports at least two modes (privileged and user). The privileged mode can only be used by the micro-kernel 216. Each user compartment 304, 306, 308 is identified by a compartment identifier (CID). The mapping of threads to CIDs is fixed.

The system also contains a secret HW key 106 which is accessible to a HW crypto engine 324 only. Each user compartment 304, 306, 308 may use the HW crypto engine 324 for protecting its own data. To achieve this, it first has to register in the micro-kernel 216 for the associated interrupt sources and access rights to the peripheral.

Upon request for HW-based crypto services, the micro-kernel 216 stores the CID of the requesting user compartment 304, 306, 308 in a special facility of the HW crypto engine 324 which cannot be changed by any user compartment 304, 306, 308.

Any time a user compartment 304, 306, 308 instructs the HW crypto engine 324 to execute secret HW key related cryptographic operations the HW crypto engine 324 automatically incorporates the CID during this operation.

All data processed by the HW crypto engine 324 thereby gets bound to the compartment 304, 306, 308 it runs in.

This mechanism results in that an attacker which has managed to penetrate the kernel level of a user compartment 304, 306, 308 may not use the HW crypto driver to tamper or unveil data belonging to other compartments 304, 306, 308.

Figure 5:
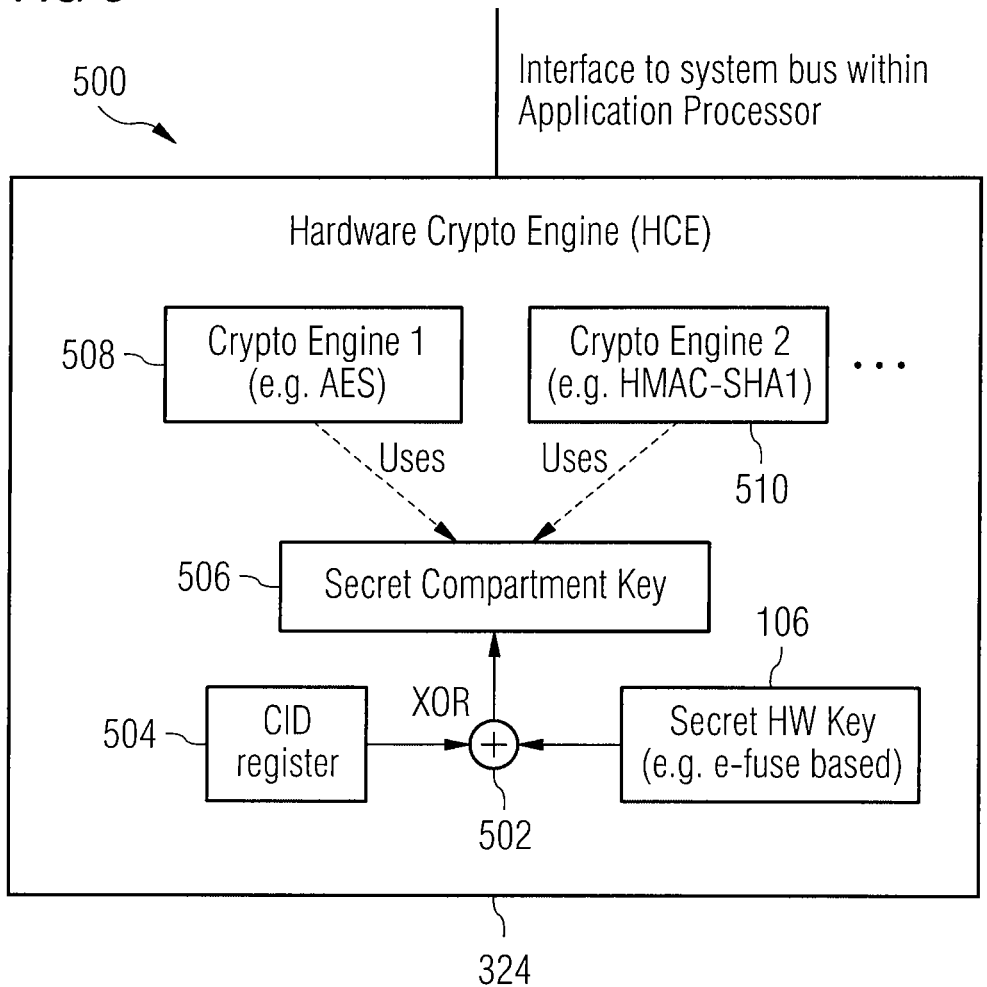
FIG. 5 shows the mapping of the address space of the cryptography unit according to an embodiment of the invention.

FIG. 5 shows in an embodiment of the invention a first example of a mechanism to bind of the CID to the secret HW key 106. The binder 502 is operating on the cryptography unit secret key 106 and the CID in the CID register 504 of the currently running user compartment 304, 306, 308 to generate a Secret Compartment Key 506 which can be used in the example of FIG. 5 by a first cryptography engine 508 and a second cryptography engine 510. As an example, the binding can be accomplished by a predefined logic function, as e.g. an eXclusive OR function. The application of an XOR operation to the secret key 106 is the simplest way to bind the CID information. This results in constructing a Secret Compartment Key 506 as follows:

Secret Compartment Key=Secret HW key XOR CID.

As in one embodiment of the invention, the number of compartments is significantly smaller than the length of a secret HW key 106, this will only affect the least significant bits. For example, if only the 8 least significant bits of the CID are used, this would support up to 256 compartments. On the contrary, the length of a secret HW key 106 is typically aligned with the length of secret key used in crypto HW accelerators, e.g. 128 bits in case of AES-128.

Instead of using an XOR operation, it is also possible to replace a certain bit field of the secret HW key 106 by the CID, e.g. if the CID contains 8 bits, the length of the secret HW key is 128 bits and the 8 least significant bits are chosen:

Secret Compartment Key=(Secret HW key AND 0xFFFF'FFFF'FFFF'FFFF'FFFF'FFFF'FFFF'FF00) OR CID.

However, this approach leads to a reduced effective key length, as the CID itself is not secret. On the contrary, a certain number of fuses could be saved.

In the following, examples of mechanisms to securely pass over CID information to the Hardware Crypto Engine 324 are described.

In terms of security, the micro-kernel 216 needs to fulfill two requirements with regard to CID provisioning:

A) The HCE driver code running in a user compartment 304, 306, 308 should not be able to change the CID once loaded into the HCE 324.

B) While the HCE 324 is used by a certain user compartment 304, 306, 308, it should not be possible to access the HCE registers from another user compartment 304, 306, 308.

Figure 6:
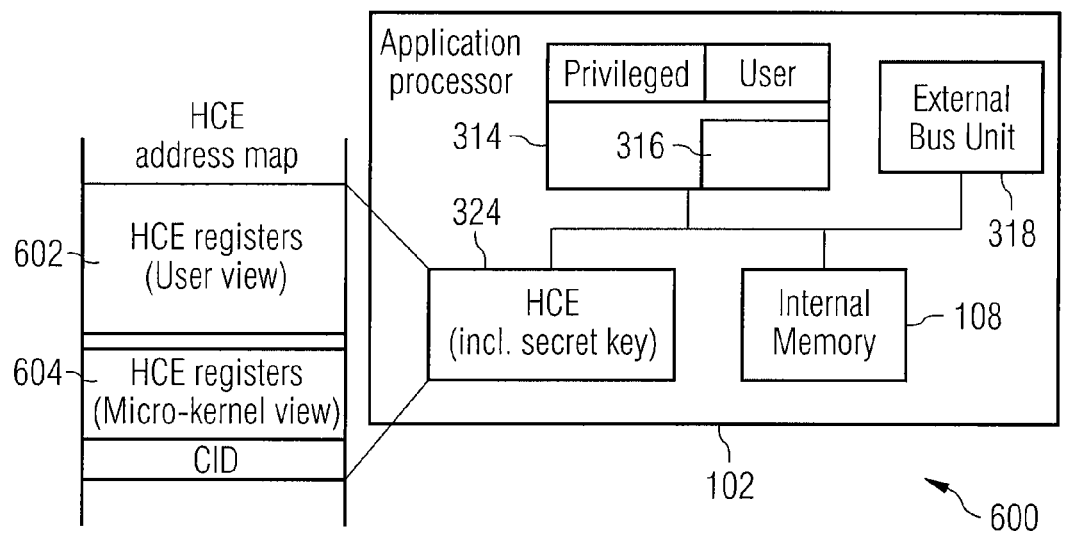
FIG. 6 shows a side channel from an internal memory address to the cryptography unit according to an alternative embodiment of the invention.

To fulfill A), as depicted in FIG. 6, it is provided as a first option that the address space of the HCE peripheral is mapped into two regions: One address space for user driver code (ASU) 602 and one address space for the micro-kernel (ASM) 604.

As the micro-kernel 216 only needs to write the CID data upon request of a user compartment 304, 306, 308, the ASM 604 could in the simplest case only consist of one register (CID register) 504. Once written, it would be loaded into the HCE 324 and used for constructing the secret compartment key 506. The ASM 604 needs to be protected by the MMU 316, as only the micro-kernel 216 shall be able to change this data. The CID register 504 is not visible in the ASU 602.

Figure 7:
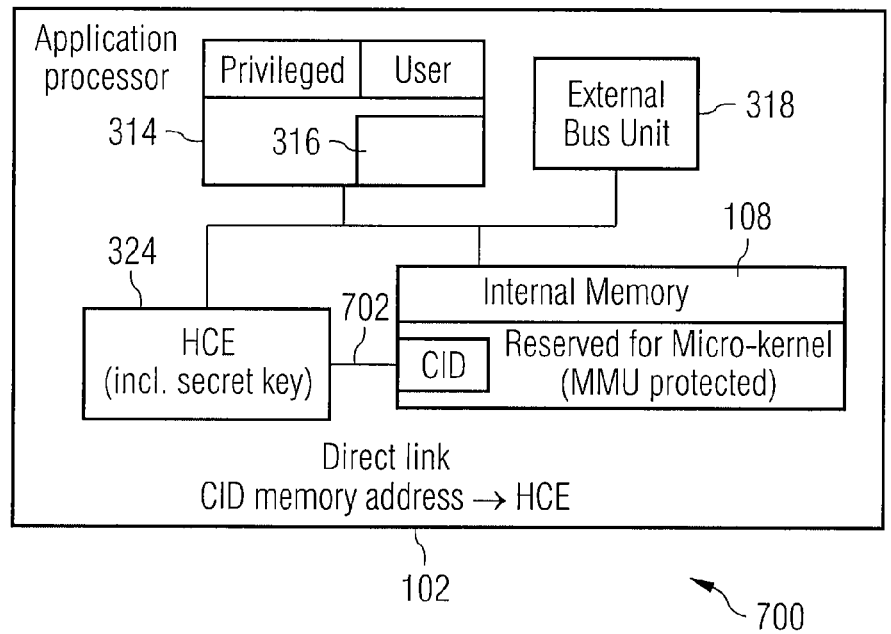
FIG. 7 shows a functional diagram of the cryptography unit according to an embodiment of the invention.

A second option is to use a "side-channel" 702 from the HCE 324 to a certain memory location in the chip internal memory 108, as depicted in FIG. 7. It would then be the task of the HCE 324, to load the CID from this memory location. This memory location must be writable by the micro-kernel 216 only and thus, protected by the MMU 316.

To fulfill B), there are two options provided in different embodiments of the invention.

According to a first option, per default, the micro-kernel 216 deactivates the access to the HCE peripheral address space. This means, it configures the page table permissions for all compartment threads accordingly. On request of a user compartment 304, 306, 308 to use HCE services, it loads the CID value as described in section A) and then maps the HCE address space with R/W permissions into the address space of the requesting compartment thread. All other compartment threads are not affected. Once the user compartment has completed its task, the micro-kernel 216 removes the R/W permissions for this thread. However, this option may result in frequent update of page tables during runtime, i.e. when many compartments request crypto services this could have negative impact on system performance.

An alternative therefore is to equip the CID information with another bit field which indicates activity the "owning" compartment (Activity Bit). In this embodiment, per default all user compartment address spaces have R/W permission to the HCE peripheral address space. But, the effect of this Activity Bit is, that the HCE 324 will only accept a command from a user compartment 304, 306, 308, if the Activity Bit of the CID indicates "Yes". This information is only set by the micro-kernel scheduler immediately before switching to that compartment thread. Afterwards, before switching to the subsequent compartment thread, the micro-kernel 324 sets the bit to "No". If an attacker in another compartment would try to use the HCE 324 in between, he would not be able to execute a single command, as the HCE 324 would detect that the Activity Bit is not set.

It is to be noted that the threat related to requirement B) is related to the fact that an attacker in a user compartment 304, 306, 308 does not necessarily require reception of HCE interrupts, as polling HCE registers is also possible. The micro-kernel will of course only forward HCE interrupts to the compartment, which currently owns the HCE peripheral.

In an embodiment of the invention, it is provided that the micro-kernel is completely executed in an internal memory. Thus, some particular hardware attacks, e.g. the change of the memory content of the external memory, which is connected via the EBU, are not successful.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A computing device, comprising:
a processing system comprising a plurality of user sub-systems, wherein the processing system is based on a micro-kernel system, and each user sub-system is located within a respective micro-kernel user compartment;
a plurality of user sub-system identifiers respectively identifying one user sub-system of the plurality of user sub-systems;
a processor configured to run the processing system;
a cryptography unit configured to provide at least one cryptographic mechanism;
a cryptography unit secret key assigned to the cryptography unit; and
a binder configured to bind the cryptography unit secret key to the user sub-system identifier of a currently running user sub-system to generate a user sub-system-specific cryptographic unit secret key,
wherein when a micro-kernel user compartment instructs the cryptography unit to provide a cryptographic mechanism, the cryptography unit is configured to during this mechanism bind the cryptography unit secret key with the user sub-system identifier of the currently running user sub-system.

2. The computing device of claim 1, wherein each micro-kernel user compartment comprises a software application, operating system software, or a combination of a software application and operating system software.

3. The computing device of claim 1, wherein the cryptography unit is a hardware crypto engine.

4. The computing device of claim 1, wherein the cryptography unit provides at least one cryptographic mechanism of a group of cryptographic mechanisms selected from the group consisting of authentication, encryption, digital signature, and cryptographic hash value generation.

5. The computing device of claim 3, wherein the cryptography unit secret key is stored in the hardware crypto engine.

6. The computing device of claim 3, wherein the user sub-system identifier of the currently running user sub-system is stored in the hardware crypto engine.

7. The computing device of claim 1, further comprising at least one memory.

8. The computing device of claim 7, wherein the user sub-system identifier of the currently user sub-system is stored in a portion of the memory that is accessible only by the cryptography unit.

9. The computing device of claim 1, further comprising at least one memory interface configured to connect at least one external memory to the computing device.

10. The computing device of claim 1, wherein the binder operates on the cryptography unit secret key and the user sub-system identifier of the currently running user sub-system to generate a user sub-system specific cryptography unit secret key.

11. The computing device of claim 10, wherein the binder operates on the cryptography unit secret key and the user sub-system identifier of the currently running user sub-system according to a predefined logic function.

12. The computing device of claim 10, wherein the binder operates on the cryptography unit secret key and the user sub-system identifier of the currently running user sub-system according to an Exclusive OR function.

13. A computing device, comprising:
a micro-kernel based processing system comprising a plurality of user sub-systems, wherein each user sub-system is located within a respective micro-kernel user compartment;
a plurality of user sub-system identifiers respectively identifying one user sub-system of the plurality of user sub-systems;
a processor configured to run the processing system;
a cryptography circuit configured to provide at least one cryptographic mechanism;
a cryptography circuit secret key assigned to the cryptography circuit; and
an operator configured to operate on the cryptography circuit secret key and the user sub-system identifier of a currently running user sub-system to generate a user sub-system specific cryptography circuit secret key,
wherein when a micro-kernel user compartment instructs the cryptography circuit to provide a cryptographic mechanism, the cryptographic unit binds the cryptography circuit secret key with the user sub-system identifier of the currently running user sub-system.

14. The computing device of claim 13, wherein each micro-kernel user compartment comprises a software application, operating system software, or a combination of a software application and operating system software.

15. The computing device of claim 13, wherein the cryptography circuit is a hardware crypto engine.

16. The computing device of claim 13, wherein the cryptography circuit provides at least one cryptographic mechanism of a group of cryptographic mechanisms selected from the group consisting of authentication, encryption, digital signature, and cryptographic hash value generation.

17. The computing device of claim 15, wherein the cryptography circuit secret key is stored in the hardware crypto engine.

18. The computing device of claim 15, wherein the user sub-system identifier of the currently running user sub-system is stored in the hardware crypto engine.

19. The computing device of claim 13, further comprising at least one memory.

20. The computing device of claim 19, wherein the user sub-system identifier of the currently running user sub-system is stored in a portion of the memory that is accessible only by the cryptography circuit.

21. The computing device of claim 13, further comprising at least one memory interface for connecting at least one external memory to the computing device.

22. The computing device of claim 13, wherein the operator operates on the cryptography circuit secret key and the user sub-system identifier of the currently running user sub-system according to a predefined logic function.

23. The computing device of claim 22, wherein the binder operates on the cryptography circuit secret key and the user sub-system identifier of the currently running user sub-system according to an Exclusive OR function.

24. A method for operating a computing device, comprising:
executing a user sub-system using a processing system comprising a plurality of user sub-systems, wherein the processing system is based on a micro-kernel system, and each user sub-system is located within a respective micro-kernel user compartment;
providing a plurality of user sub-system identifiers respectively identifying one user sub-system of the plurality of user sub-systems; and
executing a cryptography unit providing at least one cryptographic mechanism while executing the user sub-system, wherein the executing of the cryptography unit comprises binding the user sub-system identifier of a currently running user sub-system to a cryptography unit secret key being assigned to the cryptography unit to generate a user sub-system-specific cryptographic unit secret key,
wherein when a micro-kernel user compartment instructs the cryptography unit to provide a cryptographic mechanism, the cryptography unit binds the cryptography unit secret key with the user sub-system identifier of the currently running user sub-system.

25. The method of claim 24, wherein each micro-kernel user compartment comprises a software application, operating system software, or a combination of a software application and operating system software.

26. The method of claim 24, wherein a hardware crypto engine is used as the cryptography unit.

27. The method of claim 24, wherein the cryptography unit provides at least one cryptographic mechanism of a group of cryptographic mechanisms selected from the group consisting of authentication, encryption, digital signature, and cryptographic hash value generation.

28. The method of claim 26, wherein the cryptography unit secret key is stored in the hardware crypto engine.

29. The method of claim 26, wherein the user sub-system identifier of the currently running user sub-system is stored in the hardware crypto engine.

30. The method of claim 24, wherein the user sub-system identifier of the currently running user sub-system is stored in a portion of a memory that is only accessible by the cryptography unit.

31. The method of claim 24, wherein the binding is carried out by operating on the cryptography unit secret key and the user sub-system identifier of the currently running user sub-system to generate a context specific cryptography unit secret key.

32. The method of claim 31, wherein the binding is carried out by operating on the cryptography unit secret key and the user sub-system identifier of the currently running user sub-system according to a predefined logic function.

33. The method of claim 31, wherein the binding is carried out by operating on the cryptography unit secret key and the user sub-system identifier of the currently running user sub-system according to an Exclusive OR function.

* * * * *